United States Patent
Burmeister et al.

(10) Patent No.: US 7,510,217 B2
(45) Date of Patent: Mar. 31, 2009

(54) RETAINER ASSEMBLY FOR CONDUIT CONNECTION

(75) Inventors: Roy Carl Burmeister, White Lake, MI (US); Stephen Michael Monroe, Goodrich, MI (US); Daniel Francis Shelton, Pontiac, MI (US)

(73) Assignee: Hutchinson FTS, Inc., Troy, MI (US)

( * ) Notice: Subject to any disclaimer, the term of this patent is extended or adjusted under 35 U.S.C. 154(b) by 0 days.

(21) Appl. No.: 11/282,737

(22) Filed: Nov. 18, 2005

(65) Prior Publication Data

US 2007/0114790 A1    May 24, 2007

(51) Int. Cl.
*F16L 39/00* (2006.01)
(52) U.S. Cl. .................. 285/124.3; 285/19; 285/124.5
(58) Field of Classification Search ............... 285/197, 285/124.1, 124.2, 124.3, 124.4, 124.5, 139.1, 285/139.2, 139.3, 19, 319; 24/73, 455, 458, 24/569, 570; 411/526, 522, 520, 81; 248/228.7, 248/230.7, 231.81, 62, 68.1, 74.2
See application file for complete search history.

(56) References Cited

U.S. PATENT DOCUMENTS

| | | | | | |
|---|---|---|---|---|---|
| 3,218,093 | A | * | 11/1965 | Carlson | ............... 285/197 |
| 3,481,637 | A | * | 12/1969 | Penta | ............... 403/154 |
| 3,894,706 | A | * | 7/1975 | Mizusawa | ............... 248/68.1 |
| 4,021,604 | A | * | 5/1977 | Dola et al. | ............... 174/51 |
| 4,266,842 | A | * | 5/1981 | Dillon et al. | ............... 439/394 |
| 4,455,498 | A | * | 6/1984 | DeSisto | ............... 310/42 |
| 4,468,054 | A | * | 8/1984 | Orth | ............... 285/124.3 |
| 4,756,558 | A | * | 7/1988 | Beamer | ............... 285/39 |
| 5,046,765 | A | * | 9/1991 | Usui | ............... 285/197 |
| 5,071,172 | A | * | 12/1991 | Gross | ............... 285/124.4 |
| 5,195,860 | A | * | 3/1993 | Steyn | ............... 411/526 |
| 5,323,808 | A | * | 6/1994 | Shimizu | ............... 137/594 |
| 5,467,611 | A | * | 11/1995 | Cummings et al. | ............ 62/299 |
| 5,509,473 | A | * | 4/1996 | Tokutake | ............... 165/178 |
| 5,542,713 | A | * | 8/1996 | Miyazaki et al. | ......... 285/136.1 |
| 5,707,192 | A | * | 1/1998 | Vortriede et al. | ............ 411/175 |
| 6,193,283 | B1 | | 2/2001 | Pickett, Jr. et al. | |
| 6,368,039 | B2 | * | 4/2002 | Wolfe et al. | ............... 411/526 |
| 6,382,678 | B1 | | 5/2002 | Field et al. | |
| 6,447,024 | B1 | * | 9/2002 | Olson | ............... 285/319 |
| 6,634,679 | B1 | * | 10/2003 | Stieler | ............... 285/308 |

\* cited by examiner

*Primary Examiner*—James M Hewitt
*Assistant Examiner*—Jay R Ripley
(74) *Attorney, Agent, or Firm*—VanOphem & VanOphem, P.C.

(57) ABSTRACT

A retainer assembly that reduces misalignment of a conduit connection to a component. In addition, the assembly keeps the conduit in place on the component enabling the assembler to complete the assembly without having to hold the conduit. The assembly includes a connection block having a U-shaped retainer clip attached to the connection block. The retainer clip having an opening therein and a locking finger extending into the opening. The locking finger operative to engage a retention member located on the component to hold the connection block and conduit combination with respect to the component after which a fastener is used to secure the connection block and conduit combination to the component.

9 Claims, 3 Drawing Sheets

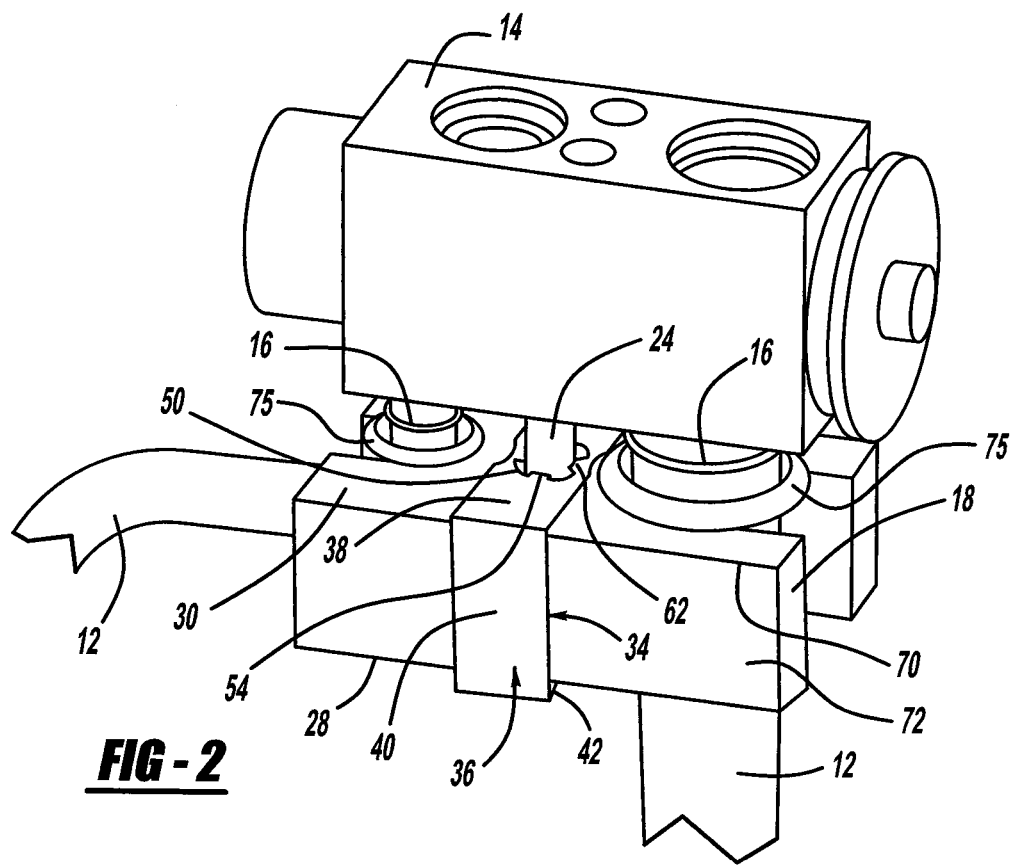
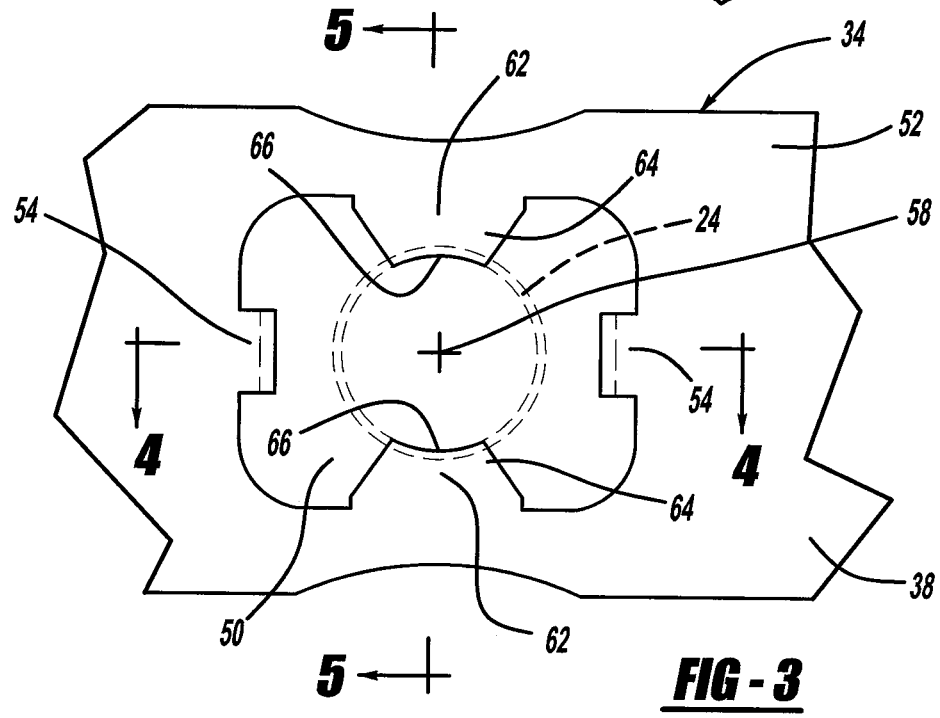
FIG-2
FIG-3

RETAINER ASSEMBLY FOR CONDUIT CONNECTION

CROSS-REFERENCE TO RELATED APPLICATIONS

Not Applicable

BACKGROUND OF THE INVENTION

1. Field of the Invention

The present invention relates generally to an assembly for connecting a conduit to a component or housing. More specifically, this invention relates to a retainer assembly including a retainer and a connection block used to align, assemble and secure the conduit to the component or housing.

2. Description of Related Art

An automotive air-conditioning system is a closed system including the following components: a compressor, condenser, receiver/dryer or accumulator, expansion valve, evaporator and conduits or lines that connect the various components. A suitable refrigerant is contained within the closed system. Normally, installation of the various air-conditioning system components is independent of one another, with the conduits connected to the components after installation of the components.

Vehicle space constraints and packaging considerations sometimes make it difficult for an assembler to attach the conduit to the various components due to their location on the vehicle. Depending on the location of the component on the vehicle and the adjacent space, it may be difficult for the assembler to hold the conduit in place on the component with one hand and use the other hand to insert and tighten a fastener used for securing the conduit to the component. In addition, since an assembler cannot always adequately view the connection between the conduit and component, installation of the conduit is done blind often resulting in misalignment and damage to the seal or endform.

Different methods and apparatuses for securing conduit to the various components are known. One prior art method uses an O-ring encircling an end of a tube mounted in a port on a component. An axial fastener encircles and connects the tube to the port. As known in the art, the axial fastener screws down over corresponding threads on the port to attach the tube to the component.

Another type of a conduit connection is a cantilevered conduit connection. A cantilevered connection typically includes a connecting block having a teardrop-shaped profile. The connecting block engages and traps the conduit in a conduit passage extending through the block. The connecting block further includes another passageway offset from and parallel to the conduit passage. A threaded fastener extends through the passageway and into the housing or component to secure the connecting block and conduit assembly to the component. One example of such a system is illustrated in U.S. Pat. No. 6,193,283 B1 to Pickett, Jr. et al. Pickett teaches an engagement device for a cantilevered conduit connection that provides an assembler with visible, audible and tactile redundant verification that the connection is completely engaged and that the conduit is mounted squarely within the conduit port of the housing.

Another system utilized to attach a conduit to a component includes a connection block. Typically, the connection block includes one or more openings or passageways extending through the connection block that receive one or more conduits. The conduits are retained in the connection block such that an end of the conduit extends past a mounting surface of the connection block. An O-ring or sealing washer located on the end of the conduit provides a seal when the conduit end is inserted into a port in the component. Accordingly, once the conduit ends are inserted into the ports on the component, a fastener extending through an opening or passageway in the connection block secures the connection block to an outer surface of the component whereby the conduit is connected to the component.

One example of an assembly utilizing a threaded fastener and a connection block is illustrated in U.S. Pat. No. 6,382,678 B1 to Field et al. Field et al. discloses a bracket for securing a male coupling portion to a female body. A threaded fastener extends through the bracket and male coupling portion and is received in the female body. Tightening the fastener causes the bracket to engage the male coupling portion and move it toward the female body until the halves are fully mated. One drawback of such a system is that the bracket and threaded fastener are separate and free from the male coupling portion. Accordingly, the assembler must hold the bracket in place on the male coupling when installing the male coupling and tightening the threaded fastener.

U.S. Pat. No. 5,323,808 to Shimizu illustrates a refrigerant charge connecting structure that maintains a connection between refrigerant plug valves and a refrigerant circuit receptacle. The structure includes identical latch members on each side of the plug block that engage latching notches located on the charge receptacle unit. The latches do not guide the plug block into place they simply act to retain the plug block once it engages the receptacle.

It should be understood that one drawback of using a connection block having respective ends of the conduit extending past the mating surface of the connection block is that if the respective halves or units are not brought together properly the O-rings or tube endforms used to provide a seal may be pinched, cut or otherwise damaged due to the misalignment. Depending upon the degree of misalignment, the O-rings may be forced out of the O-ring groove in which they are mounted. Finally, as set forth previously, due to the placement of the various components and space limitations it may not be possible for the assembler to see whether the block is properly installed and to hold the connection block in the proper position with one hand and tighten the fastener used to secure the connection block with the other.

From the above, one can see that what is needed is a retaining assembly for connecting conduit to a component of an air-conditioning system that minimizes misalignment of the connection and prevents damage to the seals and tube endforms while holding the conduit in place so that the operator can tighten a fastener used to secure the conduit to the component.

SUMMARY OF THE INVENTION

According to the present invention, there is provided a retainer assembly that minimizes misalignment of the conduit during connection to a component to reduce potential damage to a conduit seal and endform. The assembly also holds the conduit in place on the component to facilitate the assembler completing the attachment procedure without having to hold the conduit in place.

In one form of the invention, the retainer assembly includes a conduit having a circumferential groove with a circumferential seal mounted thereon. A connection block having a conduit passageway therein receives and retains the conduit. A retainer including a U-shaped member attaches to the connection block. The base of the U-shaped member having an opening therein. A locking finger extends from the base member into the opening. The locking finger engages a portion of the component to retain the connection block and conduit combination in place on the component. A suitable fastener is utilized to secure the connection block and thus the conduit to the component. The retainer facilitates alignment and installation of the connection block on the component. Additionally, a method of using the device to connect conduit to a component is also disclosed.

Accordingly, it is an object of the present invention to provide a retainer assembly including a connection block and conduit combination having a retainer attached thereto wherein the retainer holds the connection block and conduit combination adjacent to a component prior to installation of a fastener used to secure the connection block and conduit combination to the component.

It is still another object to provide a retainer assembly that facilitates proper installation and aids proper alignment of the connection block and conduit combination with the component to maintain a seal between the conduit and component.

It is still another object to provide a retainer assembly that aligns and retains a connection block and conduit combination to a component wherein the connection block includes a retention passageway and the component includes a threaded stud disposed in and extending through the passageway.

These objects and other features, aspects and advantages of this invention will be more apparent after a reading of the following detailed description, appended claims and accompanying drawings.

BRIEF DESCRIPTION OF THE DRAWINGS

FIG. 2 is a perspective view of the retainer assembly illustrated in FIG. 1 according to the present invention shown partially assembled;

FIG. 3 is a partial top view of a retainer of the retainer assembly illustrated in FIG. 2;

DETAILED DESCRIPTION OF THE PREFERRED EMBODIMENTS

Figure 1:
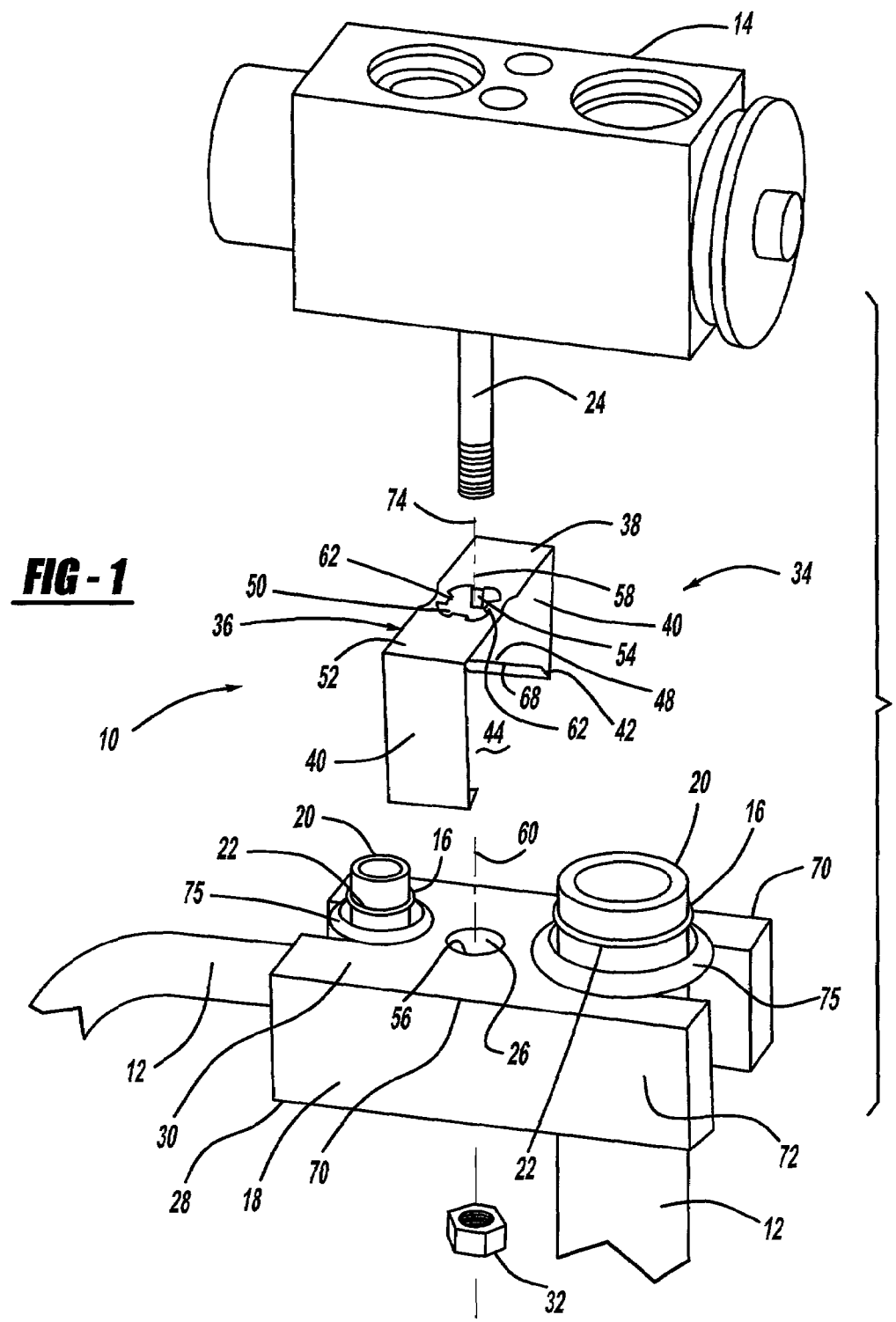
FIG. 1 is an exploded perspective view of a retainer assembly according to the present invention.

Disclosed is a retainer assembly, seen generally at 10, for coupling a conduit 12 to a component, illustrated in FIG. 1 as an expansion valve 14, of an automotive air-conditioning system. The retainer assembly 10 facilitates proper alignment of the conduits 12, which reduces possible damage to the conduit seal, illustrated as an O-ring 16 or the tube endforms 20. In addition, the retainer assembly 10 holds the conduits 12 in place with respect to the expansion valve 14 while the assembler installs and tightens a fastener used to secure the conduits 12 to the expansion valve 14.

While the present invention is described in detail with respect to an automobile air-conditioning system, the present invention is also well suited to other applications involving conduit connections, including steering, braking and hydraulic systems and other applications. In addition, while the conduits 12 are shown herein connected to an expansion valve 14, the present invention is also suitable for connecting the conduits 12 to various other components of an automobile air-conditioning system such as the condenser, evaporator, receiver/dryer, accumulator or compressor. In addition, the present invention may be used to connect conduit lines to one another.

Referring now in detail to the figures, illustrated in FIG. 1 is an exploded view of the retainer assembly 10 in accordance with the present invention. The retainer assembly 10 includes a connection block 18. As illustrated, the conduits 12 are secured within the connection block 18 in a known manner. The tube endforms 20 of the conduits 12 typically include a circumferential groove 22 in which a circumferential seal, such as the O-ring 16 is placed. It should be understood that the conduits 12 are secured in the connection block 18 by a well known process which upsets the tube endforms 20 to create a bead 75 such that the tube endforms 20 of the conduits 12 extend outwardly from the connection block 18. Accordingly, the tube endforms 20 fit into apertures or ports located on the expansion valve 14 when the connection block 18 is placed adjacent and secured to the expansion valve 14. The O-rings 16 cooperate with an inner surface of the ports or apertures on the expansion valve 14 to form a fluid seal.

In the illustrated embodiment, the connection block 18 is secured to the expansion valve 14 using a threaded stud or bolt 24. As shown, a passageway 26 extends between a retaining surface 28 and an engagement surface 30 of the connection block 18. The connection block 18 is placed adjacent the expansion valve 14 with the threaded stud 24 extending through the passageway 26, see FIG. 2. A nut or fastener 32 threadably received on the threaded stud 24 is tightened until it engages the retaining surface 28 of the connection block 18 to secure the connection block 18 to the expansion valve 14.

A retainer clip, seen generally at 34, attached to the connection block 18 engages the threaded stud 24. As set forth more fully herein, the retainer clip 34 facilitates alignment of the connection block 18 and correspondingly the conduits 12 with the ports located on the expansion valve 14 to facilitate installation and reduce potential damage to the O-rings 16 and tube endforms 20 thus ensuring a proper seal. In addition, the retainer clip 34 also holds the connection block 18 in position, adjacent to the expansion valve 14, whereby the assembler's hands are free to install the nut or fastener 32 without having to hold the connection block 18 in place on the expansion valve 14.

As illustrated in the figures, the retainer clip 34 includes a U-shaped member 36 having a base 38 and two leg portions 40. Each leg portion 40 is angled inwardly into the cavity 44 formed by the U-shaped member 36. Each leg portion 40 includes a locking tab 42 also extending inwardly into the cavity 44 formed by the U-shaped member 36. The locking tabs 42 also extend inwardly toward the base 38. The U-shaped member 36 is sized to fit over the connection block 18 whereby the inner surface 46 (shown in FIG. 4) of the U-shaped member 36 contacts the engagement surface 30 of the connection block 18 and the ends 48 of the locking tabs 42 engage the retaining surface 28 of the connection block 18. It should be understood that the U-shaped member 36 is formed of a resilient material such as spring steel. Other suitable materials having suitable resilience and strength may also be used.

Figure 4:
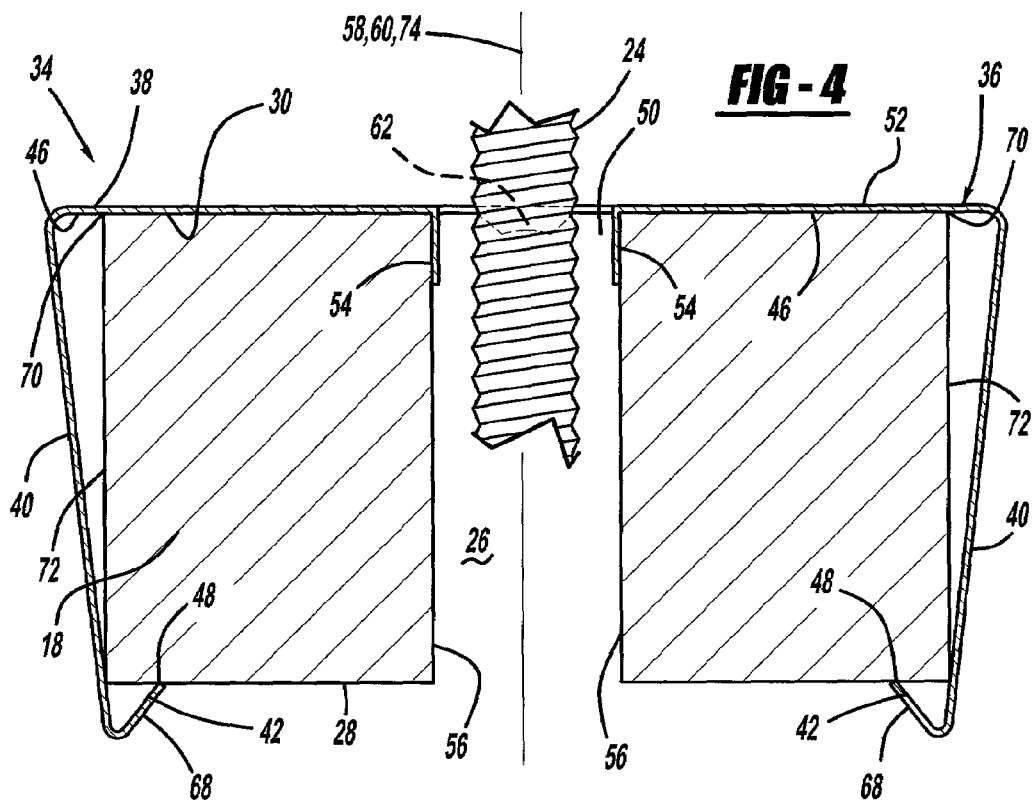
FIG. 4 is a cross section of the retainer taken along lines 4-4 of FIG. 3.

As illustrated in FIGS. 1-5, the base 38 of the U-shaped member 36 includes an opening 50 extending between the upper or outer surface 52 and lower or inner surface 46 of the base 38. A pair of opposed locating tabs 54 extend inwardly into the cavity 44 formed by the U-shaped member 36. As illustrated in FIG. 4, the locating tabs 54 engage the sidewalls 56 of the passageway 26 to keep the retainer clip 34 positioned away from the beads 75 and in position on the connection block 18. While shown with only two locating tabs 54, it may be desirable to include additional locating tabs 54 as necessary.

The retainer clip 34 further includes a pair of opposed fingers 62 extending inwardly into the opening 50. The outer or free ends 64 of each finger 62 having an arcuate outer edge 66 having a radius slightly less than the radius of the threaded stud 24. In accordance with the invention, the fingers 62 are inclined inward toward the cavity 44 formed by the U-shaped member 36 at an angle a, see FIG. 5. The angle a can vary within reasonable limits but is preferably in the range from 30° to 50°. Additionally, the fingers 62 may be tilted such that the arcuate outer edge 66 is at an angle with the base 38 and lies along an imaginary helical path corresponding to the helical path of the threads on the threaded stud 24. The arcuate outer edges 66 of the free ends 64 of the fingers 62 are sized such that they encompass or engage enough of the outer surface of the threaded stud 24 to accurately position or center the retainer clip 34 and thus the connection block 18 on the threaded stud 24. While shown with only two fingers 62, it may be desirable to use additional fingers 62 spaced circumferentially about the centerline 58 of the opening 50 to ensure that the centerline 58 of the opening 50 is aligned coaxially with the centerline 74 of the threaded stud 24.

FIG. 1 illustrates the retainer assembly 10 before assembly. As illustrated in FIG. 2, the retainer clip 34 is placed on the connection block 18 by placing the locking tabs 42 against the outer edge 70 of the upper or engagement surface 30 of the connection block 18. The outer surfaces 68 of the locking tabs 42 act as cam surfaces to spread the leg portions 40 outwardly enabling the retainer clip 34 to slide over and along the respective sides 72 of the connection block 18. The locking tabs 42 slide along the respective sides 72 of the connection block 18 until the ends 48 of the locking tabs 42 clear the sides 72 and snap inwardly to engage the retaining surface 28 of the connection block 18. As the retainer clip 34 is placed over the connection block 18 the locating tabs 54 are inserted into the passageway 26 to properly locate the retainer clip 34 on the connection block 18 such that the respective centerlines 58, 60 of the opening 50 of the retainer clip 34 and of the passageway 26 are coincidental.

Once the retainer clip 34 is in place, the connection block 18 is placed on the expansion valve 14 by inserting the threaded stud 24 into the opening 50 of the retainer clip 34. Using a suitable amount of force, the assembler pushes the connection block 18 upwards, which deflects the fingers 62 outward such that they are guided by sliding along the outer threaded surface of the threaded stud 24. Since the arcuate outer edge 66 of the fingers 62 has a slightly smaller radius than the threaded stud 24, the fingers 62 function to center the threaded stud 24 such that the centerline 74 of the threaded stud 24 coincides with the respective centerlines 58, 60 of the opening 50 of the retainer clip 34 and passageway 26.

Accordingly, the position of the connection block 18 is controlled. Controlling the position of the connection block 18 reduces the potential for misalignment of the tube endforms 20 with the ports on the expansion valve 14 and thus reduces the likelihood of O-ring 16 misalignment. Reducing the likelihood of O-ring 16 misalignment correspondingly reduces the likelihood that the O-ring 16 may be pinched, cut, forced out of the circumferential groove 22 or otherwise damaged causing a loss of seal that results in refrigerant loss and possible damage to the air-conditioning system or components thereof. Thus, the retainer clip 34 functions as a guide to ensure proper alignment of the connection block 18 and conduit 12 with the expansion valve 14.

Figure 5:
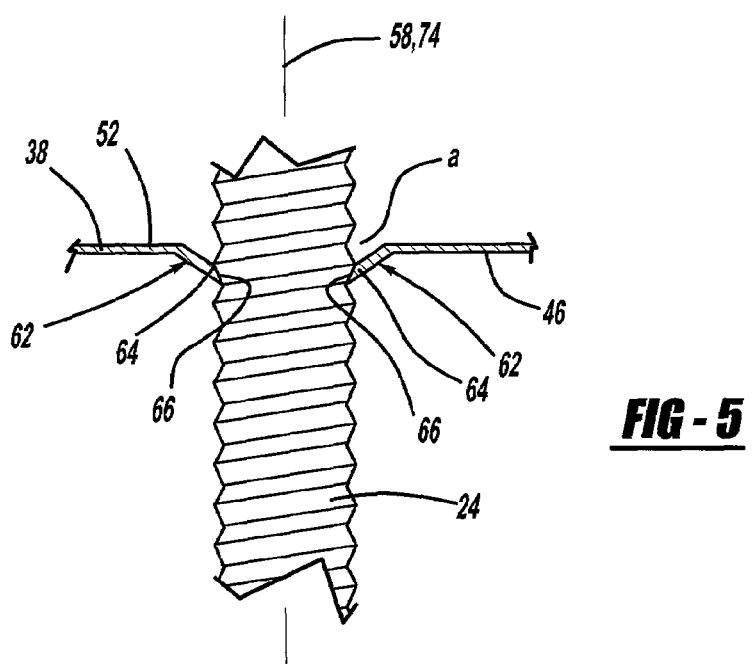
FIG. 5 is a cross section of the retainer taken along lines 5-5 of FIG. 3.

In addition, another advantage of the present invention is that the retainer clip 34 also holds the connection block 18 on the threaded stud 24 of the expansion valve 14 without the assembler having to hold it in place against the expansion valve 14. As illustrated in FIG. 5, the fingers 62 engage and grip the threads of the threaded stud 24. Accordingly, the retainer clip 34 functions as a push type fastener that uses a camming action to secure the connection block 18 to the expansion valve 14. After the assembler slides the connection block 18 in place, the retainer clip 34 holds the connection block 18 and conduit 12 combination on the threaded stud 24 of the expansion valve 14 while the assembler places and tightens the nut 32 on the threaded stud 24 to secure the connection block 18 and conduit 12 combination to the expansion valve 14.

Accordingly, referring in general to all of the figures, the present invention accurately positions a connection block and conduit combination on a component of an air-conditioning system and thereby significantly reduces misalignment of the conduit ends with the ports on the component, which reduces potential damage to the O-rings forming a seal between the conduit and component. In addition, once properly located, the connection block is held in place by the retainer clip eliminating the need for the assembler to hold the connection block and conduit combination in place while threading and tightening the nut on the threaded stud. The assembler simply slides or pushes the connection block into position where the retainer clip enables the assembler to start and tighten the nut without having to hold the connection block and conduit combination in position.

While the present invention has been described in terms of a preferred embodiment, it is apparent that other forms could be adopted by one skilled in the art. In other words, the teachings of the present invention encompass any reasonable substitutions or equivalents of claim limitations. Accordingly, the scope of the present invention is limited only by the following claims.

What is claimed is:

1. A retainer assembly for connecting at least one conduit to a refrigeration component, said retainer assembly comprising:
   a connection block having:
   an engagement surface;
   a retaining surface opposite to said engagement surface;
   at least one conduit passageway extending between said engagement surface and said retaining surface wherein said at least one conduit is positioned in said at least one conduit passageway; and
   a retention passageway having a central axis and extending between said engagement surface and said retaining surface; and
   a retainer clip secured to said connection block, said retainer clip comprising:
   an opening having a central axis;
   at least one finger extending into said opening; and
   at least one locating tab adjacent said opening, said at least one locating tab extending into said retention passageway when said retainer clip is attached to said connection block such that said at least one locating tab contacts a side wall of said retention passageway to orient said opening with respect to said retention passageway whereby said central axis of said opening and said central axis of said retention passageway are substantially co-linear.

2. A retainer assembly as claimed in claim 1, wherein said retainer clip further comprises a U-shaped member having a base and two leg portions, said opening located in said base, each of said legs having a locking tab located on a distal end thereof, whereby each of said locking tabs engages said connection block to attach said retainer clip to said connection block.

3. A retainer assembly as claimed in claim 1 wherein said retainer clip comprises a plurality of fingers extending into said opening, each of said plurality of fingers inclined at an angle with respect to a base portion and having an arcuate outer edge.

4. A retainer assembly as claimed in claim 1 further comprising an outwardly extending partially threaded member attached to said refrigeration component, said at least one finger of said retainer clip engaging said extending partially threaded member to hold said connection block to said refrigeration component.

5. A retainer assembly as claimed in claim 1, wherein said retainer clip is attached to said connection block such that said opening of said retainer clip is adjacent to said retention passageway; and wherein said retainer assembly further comprises:
   a partially threaded post member extending outwardly from said refrigeration component; and
   said at least one finger engaging said partially threaded post member to hold said connection block to said refrigeration component.

6. A retainer assembly as claimed in claim 5 further comprising a fastener threadably received on said partially threaded post member, said fastener operative to secure said connection block to said refrigeration component.

7. A retainer assembly as claimed in claim 6 wherein said retainer clip comprises a plurality of fingers extending into said opening, each of said plurality of fingers inclined at an angle with respect to said base and having an arcuate inner edge such that each of said plurality of fingers engage said partially threaded post member to hold said connection block to said refrigeration component.

8. A retainer assembly as set forth in claim 6, wherein said retainer clip further comprises a U-shaped member having a base and two leg portions, said opening located in said base, each of said legs having a locking tab located on a distal end thereof, said locking tabs engaging said connection block to attach said retainer clip to said connection block.

9. A retainer assembly as claimed in claim 6 wherein said retainer clip is attached to said connection block such that said opening of said retainer clip is adjacent to said retention passageway.

* * * * *